United States Patent
Macpherson et al.

(10) Patent No.: US 6,845,400 B2
(45) Date of Patent: Jan. 18, 2005

(54) STORING SUBSCRIBER LOCATION INDICATION AT DNS, TO ENABLE LOCATION SPECIFIC PROVISION OF INTERNET CONTENT

(75) Inventors: Andrew Macpherson, Much Hadham (GB); Philip Davies, Chelmsford (GB)

(73) Assignee: Nortel Networks Limited, St. Laurent (CA)

( * ) Notice: Subject to any disclaimer, the term of this patent is extended or adjusted under 35 U.S.C. 154(b) by 717 days.

(21) Appl. No.: 09/750,868

(22) Filed: Dec. 28, 2000

(65) Prior Publication Data

US 2002/0087726 A1 Jul. 4, 2002

(51) Int. Cl.[7] ............................................. G06F 15/16
(52) U.S. Cl. ........................ 709/245; 709/229; 709/227
(58) Field of Search ................................ 709/245, 229, 709/227

(56) References Cited

U.S. PATENT DOCUMENTS

| | | |
|---|---|---|
| 5,519,760 A | 5/1996 | Borkowski et al. |
| 6,466,976 B1 * | 10/2002 | Alles et al. ................. 709/224 |
| 6,614,774 B1 * | 9/2003 | Wang ........................ 370/338 |
| 2003/0053444 A1 * | 3/2003 | Swartz ...................... 370/352 |

FOREIGN PATENT DOCUMENTS

| | | | |
|---|---|---|---|
| EP | 0 817 444 | 1/1998 | H04L/29/06 |
| WO | WO 98/12643 | 3/1998 | G06F/13/00 |
| WO | WO 00/52594 | 9/2000 | G06F/17/00 |
| WO | WO 00/67450 | 11/2000 | H04L/29/12 |

* cited by examiner

Primary Examiner—Krisna Lim
(74) Attorney, Agent, or Firm—Barnes & Thornburg, LLP

(57) ABSTRACT

Methods, apparatus, and software for accessing location based Internet services by automatically populating DNS tables with subscriber location information. The DNS tables are updated responsive to information provided on subscriber call set-up. The location may be derived directly for the content of the call set-up, or may be derived in conjunction with one or more pre-existing databases. Ideally the DNS entry is a mapping from IP address (or subnet address) to location, though a mapping from domain name to location will also be effective. When a location based service is requested by a subscriber, the requested service may interrogate the DNS table to retrieve the requesting user's location without requiring further subscriber intervention.

16 Claims, 5 Drawing Sheets

STORING SUBSCRIBER LOCATION INDICATION AT DNS, TO ENABLE LOCATION SPECIFIC PROVISION OF INTERNET CONTENT

FIELD OF THE INVENTION

The present invention relates to a method and apparatus for providing locality-related Internet services and a system incorporating the same.

BACKGROUND TO THE INVENTION

An increasing number of Internet Application Service Providers (ASP's) are providing services over the internet which make use of user location information to provide customised information to each user, based on that user's present location.

Typical of such services are those which request location information from the user and subsequently present web pages to that user, based on the user's location. For example, a user may view a pizza restaurant chain's home page, which requests details of his location; the user enters and sends the details; and the user is then presented with a web page containing details of the branch of the chain nearest the user's stated location.

A problem with this method is that where any one user wishes to access multiple such services, he is required to re-enter substantially the same location details for each such service used, since the location information provided to one service provider is unavailable to another. Furthermore, the level of granularity of the location information may vary markedly between services: one service provider may request the information in the form of a postal address code whilst another may request it simply in the form of the name of the nearest town; some services may require only an indication of the country in which the user is located.

At present, known mechanisms available to ASP's to customise the information presented to the end user for their locality is either (a) fine grained but based on customer interaction, (b) coarser-grained and based on Internet domain names, which are at best country-specific, or (c) based on Classless Internet Domain Routing (CIDR) routing blocks which are continent—and ISP—specific.

To mitigate the effects of multiple data re-entry, one known approach is to store location details already provided to one such service in a "cookie" on the user computer. Subsequent accesses to the same service can access the cookie and extract the location information automatically without further user intervention.

Problems still remain with this approach. It does not address the problem of having to re-enter location information to disparate services, at least on the first use of each of those services. Nor does it take account of the user changing location between accesses to the same service (for example by accessing the internet over a mobile network, or by having moved home): in neither of these cases does historic location information necessarily represent the user's present location, and further location re-entry is required.

Another known approach is to modify the service provider's response based on the domain name, IP address, preferred language, or other content negotiations when receiving the initial web request.

A problem with these approaches is that none of them provide fine-grained location information to the ASP, and all impose considerable complexity on each application.

There already are telephony techniques for deriving locations both to support the Emergency Services and also "Intelligent Network" call routing, for example where a National low call number is routed to the appropriate franchisee for the area the call comes from.

There are also emerging standards for accessing locations of Cellular Phones, with a legislative requirement that the call can be located to within 100$m$. WAP phones can be interrogated as to their current cell (or group of cells), and recent press announcements demonstrate the existence of technologies for specialised WAP location based service.

Additionally there is work in the Internet Engineering Technology Forum (IETF) on a Spatial Location Service, with emphasis on discovery, authentication, trust and verification. For example, the draft contribution "ISL Architectural Considerations" proposes definitions of a new service, requiring creation and use of location agents and/or proxies. Implementation of such an arrangement is potentially complex and makes little, if any, use of existing infrastructure.

OBJECT OF THE INVENTION

The invention seeks to provide an improved method and apparatus for providing locality-related Internet services and which mitigates one or more problems associated with the prior art.

SUMMARY OF THE INVENTION

According to a first aspect of the present invention there is provided a method of providing internet access comprising the steps of: receiving from a subscriber a connection request comprising an entity identification; deriving a location indication associated with the subscriber responsive to the entity identification; and causing an association between the location indication and a name associated with the connection to be created in a DNS table.

In a preferred embodiment the method also comprises the step of: making available the location indication responsive to a DNS request.

Preferably, the name is an Internet protocol address.

In a further preferred embodiment, the Internet protocol address is a subnet address.

Preferably, the entity identification comprises at least one of: a calling number identification, a called number identification, an exchange modem identification, an incoming trunk group identification, a mobile handset location identification, a subscriber location identification, and a subscriber account identification.

Preferably, the step of deriving comprises: where the request comprises a subscriber location identification, translating the subscriber location identification to a location indication in a pre-determined format; where the request comprises a calling line identification, translating the calling line identification to a location indication in a pre-determined format by means of at least one database containing pre-determined translation information; and where the request comprises an exchange modem identification, translating the exchange modem identification to a location indication in a pre-determined format by means of at least one database containing pre-determined translation information.

According to a second aspect of the present invention there is provided a method of providing internet content comprising the steps of: receiving a content request from a subscriber; requesting, from a DNS, a location indication associated with the content request; providing content to the subscriber responsive to the location indication and the content request.

Preferably, the content request comprises a requesting address and in which the step of requesting comprises requesting, from the DNS, a location indication associated with the requesting address.

Preferably the method also comprises the step of: where the DNS contains no location indication associated with the content request, providing default content to the subscriber responsive to the content request.

Advantageously, the methods makes use both of information already readily available and of the existing infrastructure to provide location-based services.

Advantageously the method may be implemented simply, and the set-up may be performed without active user initiation.

The invention is also directed to apparatus having components arranged to perform all the steps of the methods according to the other aspects.

In particular, according to a second aspect of the present invention there is provided an internet service provider apparatus comprising: a port for receiving from a subscriber a connection request comprising an entity identification; a component for arranged for deriving a location indication associated with the subscriber responsive to the entity identification; and a component for causing an association between the location indication and a name associated with the connection to be created in a DNS table.

Preferably, the apparatus additionally comprises: a component for making available the location responsive to a DNS request.

The invention also provides for an Internet service provider network comprising apparatus according to claim 10.

According to a fourth aspect of the present invention, there is provided Internet content provider apparatus comprising: a component for receiving a content request from a subscriber; a component for requesting from a DNS an location indication associated with the subscriber; a component for providing content to the subscriber responsive to the location indication and the content request.

Preferably the apparatus additionally comprises: a component for, where the DNS contains no location indication associated with the subscriber, providing default content to the subscriber responsive to the content request.

The invention also provides for a system for the purposes of telecommunications which comprises one or more instances of apparatus embodying the present invention, together with other additional apparatus.

The invention is also directed to programs for a computer, each comprising components arranged to perform each of the method steps of a method according to the present invention.

In particular, there is provided a program for a computer on a machine-readable medium arranged to provide internet access and comprising: code for receiving from a subscriber a connection request comprising an entity identification; code for deriving a location indication associated with the subscriber responsive to the entity identification; and code for causing an association between the location indication and a name associated with the connection to be created in a DNS table.

There is also provided a program for a computer on a machine-readable medium arranged to providing Internet content and comprising: code for receiving a content request from a subscriber; code for requesting, from a DNS, a location indication associated with the content request; and code for providing content to the subscriber responsive to the location indication and the content request.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
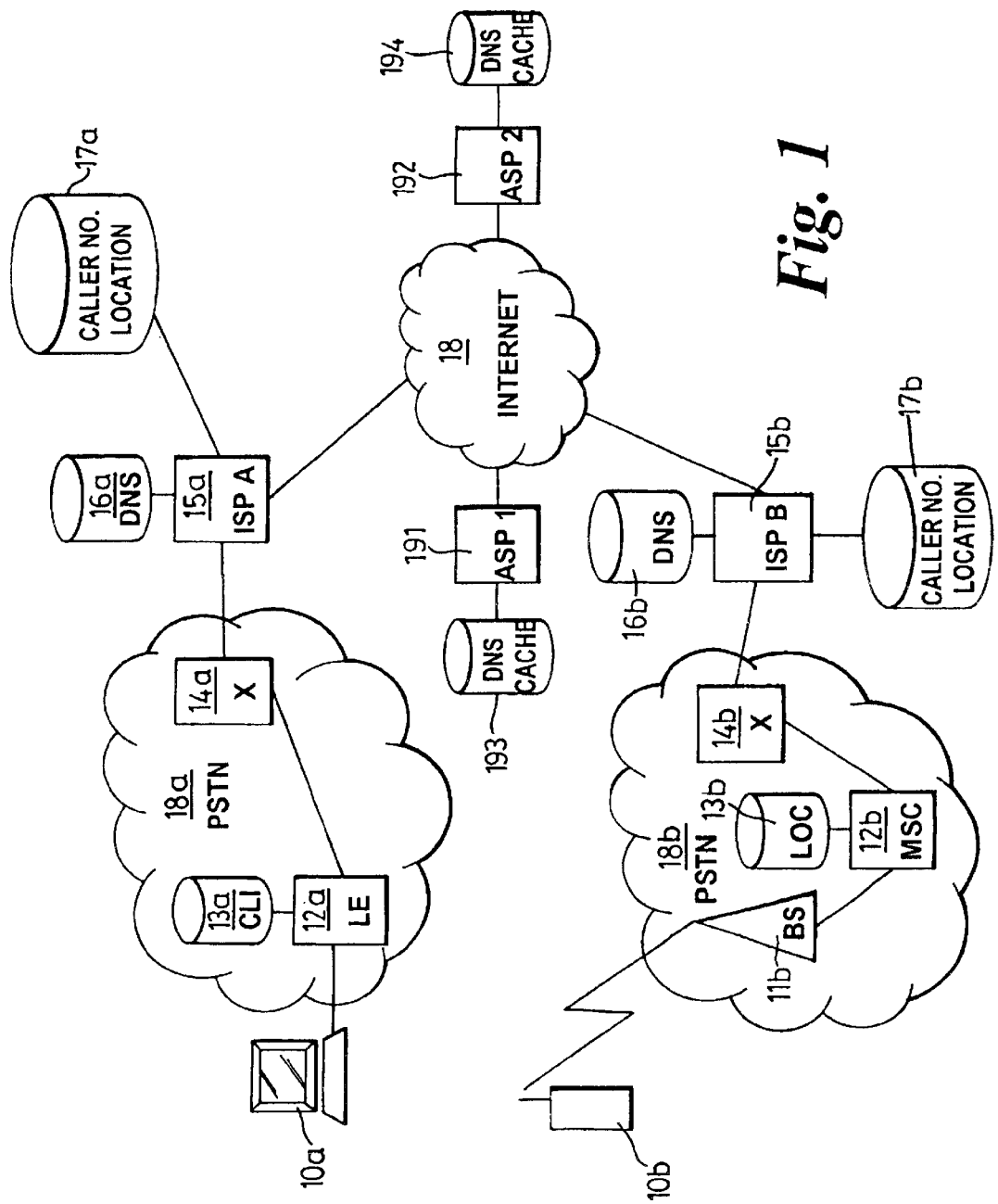
FIG. 1 shows an example of a system in accordance with the present invention.

Referring to FIG. 1, there is shown a telecommunications system supporting subscriber access to services available on the Internet. The example presented shows a subscriber terminal 10a and subscriber mobile terminal 10b connected to respective Internet service providers 15a, 15b associated with respective DNSs 16a, 16b via respective access networks 18a, 18b. The Internet service providers 15a, 15b in turn provide access via the Internet 18 to application service providers 191, 192 associated with respective DNS caches 193, 194. Access network 18a exemplifies a typical wireline connection from subscriber terminal 10a via a local exchange 12a and possibly other switches 14a to the ISP 15a. At some point within the access network, means are provided to associate calling line information (CLI) 13a with calls made from the subscriber terminal 10a to ISP 15a.

In the case where a mobile subscriber terminal 10b accesses an ISP 15b via a mobile network 18b the arrangement is in many ways similar: the call from the terminal 10b is received by a base station (BS) 11b from where it is conveyed to a mobile switching centre (MSC) 12b and subsequently via other switches 14b to the requested ISP 15b. In this case the access network 18b may associate location information 13b derived from information received, for example, from both the base station 11b on which the connection is being made, and from adjacent base stations in communication with the mobile handset 10b in preparation for potential handover. This information can be further associated with the mobile subscriber calling line information, thereby identifying both the terminal and its location.

The precise method for derivation of the location of the caller is not critical to the overall method, since any technique having similar effect could be used in place of those described. One such derivation is based upon the provisioning and billing databases of the telecommunications operator providing a mapping from the callers' number to their address.

The majority of users of the Internet make transient connections, either by dialling up or by powering on a broadband connection such as an ADSL or cable modem link. Furthermore, dial up users may be at their normal point of attachment or on the road—using a hotel phone, a cellular/WAP phone or other convenient link.

Other Internet devices, however, may be permanently attached to the network at a fixed location. These fixed devices may be permanently tagged with location information, as part of their basic installation. While not specifically handled by the communications network, the tagging methods disclosed here may also be applied to such permanently linked devices.

At a high level view, the method comprises the steps of;
providing, to an ISP 15a, 15b, location information associated with a subscriber 10a, 10b call;
storing that location information in a DNS table entry 16a, 16b for use by any information or service provider 191, 192 in connection with web requests made as part of the subscriber connection.

These broad steps are described in more detail in turn below.

Location information about a caller may be presented to, or derived by, an ISP in any one of a number of ways. The specific details of the method may vary according to the network over which the subscriber accesses the ISP. Examples of accessing locality-related services are presented below for the following cases:

access via a wireline (POTS) connection;
access via a mobile wireless connection;
access via a private network connection; and
access via an xDSL connection or cable modem.

Calls dialled from a Fixed Telephone Line are numerically the most prolific case since the majority of users currently access the Internet over fixed links, even when roaming.

Referring to FIG. 1, when a subscriber 10a calls an ISP 15a, the signalling associated with that call has associated with it a Calling Line Identifier (CLI). It may also have a flag to prohibit release of the number to the called equipment. In some countries there is also provision for caller-supplied text to be conveyed for presentation on "Caller Display" equipment.

Some ISP's may, as part of a general anti-abuse enforcement, refuse to accept incoming calls for which the calling number is suppressed. However this is not an issue where the ISP is also a Telco, since it will then have full access to the signalling information.

Where CLI information is provided to the ISP on connection, this may be used to associate a geographic location with the originating subscriber. One such method for deriving a location from the CLI involves use of one or more datasets 17a including for example: a mapping from Dial Number (DN) to Address (e.g. including Postcode/Zip Code); a mapping from post code to Geographic coordinates; or a mapping from calling line numbering plan to location.

A first example of such a method comprises the steps of:
breaking the phone number obtained from the CLI information down into a series of consecutive parts, each indicative of successively smaller geographic areas. For example, for calling number +44-1279-429531:
1. "+44" identifies the call as originating from the United Kingdom;
2. "1279" identifies the call as originating from an area around the towns of Harlow and Bishop's Stortford, and including surrounding villages;
3. "42" identifies the call as originating from an area served, for example, by a specific remote concentrator unit (RCU) identified by digits "42", say Harlow town itself;
looking up Harlow in a Towns to Grid Reference Table, thereby Identifying the nominal call originating location as being approximately 00 07 00 E/51 4615 N, ±3 Miles.

A second such method, which may yield finer resolution of location, comprises the steps of:
using the Calling Line number to look up the Postcode from a Dial Number to Address Table;
if successful; then using the post code to index a table from postcode to geographic table (for example as available from the Ordnance Survey for the United Kingdom);
If not successful, then breaking the phone number down into a series of parts as per the first method described above.

Where caller data (CLI) is suppressed, whether by the access network operator or by the caller, an appropriate default location may be assigned to the call. For example, if it can be deduced or assumed that the call originates from, say, the United Kingdom, then a nominal location somewhere in Teeside, in NE England, with a radius of uncertainty of about 450 miles would adequately encompass most of the United Kingdom.

Referring still to FIG. 1, for calls from a cellular phone 10b, the mobile access network 18b can typically identify the geographic location of the calling subscriber to within 50 metres. This information is typically available to national emergency services and can similarly be made available to ISP's 15b. The information is typically derived from information identifying the cellular base station 11b on which the call is received, along with information received form other base stations in its vicinity. In this case, the access network may provide location information 13b in a form directly usable by the ISP, without requiring further reference to location mapping tables 17b, though such reference could still be made where, for example, the ISP employs a different location measure from that provided by the network.

For mobile callers, it may also be desirable to signal from the access network 18b to the ISP during an Internet session in order to keep location information up to date as the subscriber moves from location to location during a session.

A Corporate switchboard differs from a residential POTS connection only in number of simultaneous links. There may also be a better post-code to location mapping, since many corporations have unique Postcodes for each site.

For commercial use xDSL and Cable modems are simply alternative ways of fulfilling traditional static line access. The user will have a fixed address block and be responsible for populating their own DNS.

In the consumer case DSL remains a point-to-point technology, so the location of the subscriber end point is known and can be pre-loaded into the provider's database. The DSLAM termination allows telecomms network the provider to cross-reference which customer is being assigned which address, and maintain the linkage with the location, even where dynamic address allocation is being used.

Cable modems equally are CPE supplied by the Communications provider. Recording the MAC address is a fundamental part of managing a cable modem system, as it can be used to en/disable the communications path.

Again the provider is able to identify the location of equipment to at least the postcode level.

Where Cable Modems and DSL provision includes gatewaying user access via a NAT with consequent highly volatile IP address to location mapping, it is expected that the provider will assign a generic LOC record to cover the region served.

Figure 2A:
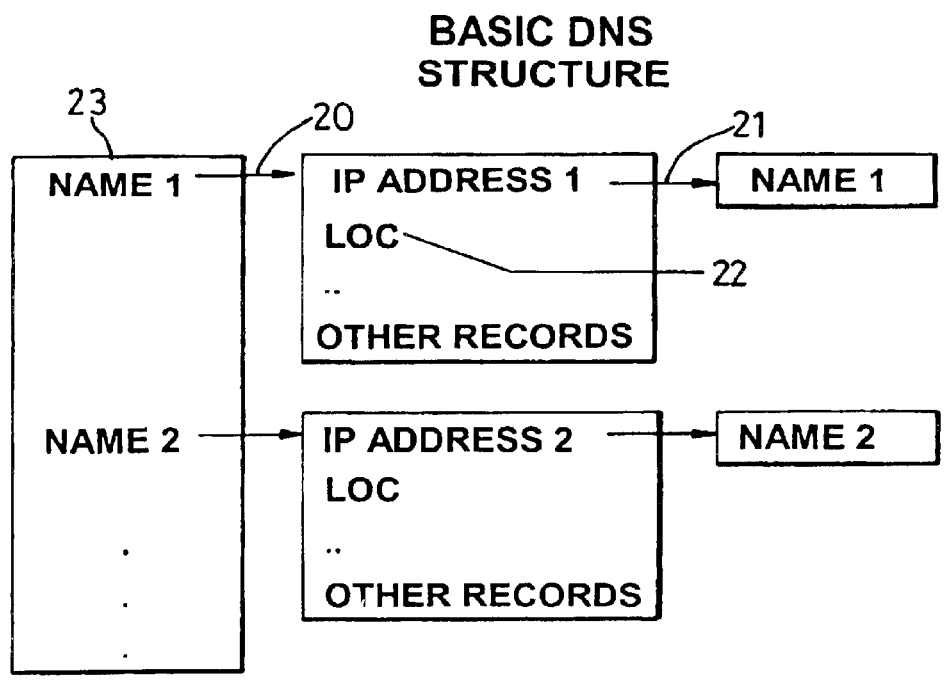
FIGS. 2(a) and (b) show examples of a basic DNS structure according to the prior art and modified DNS structure respectively, each of which may be used in the present invention.
Figure 2B:
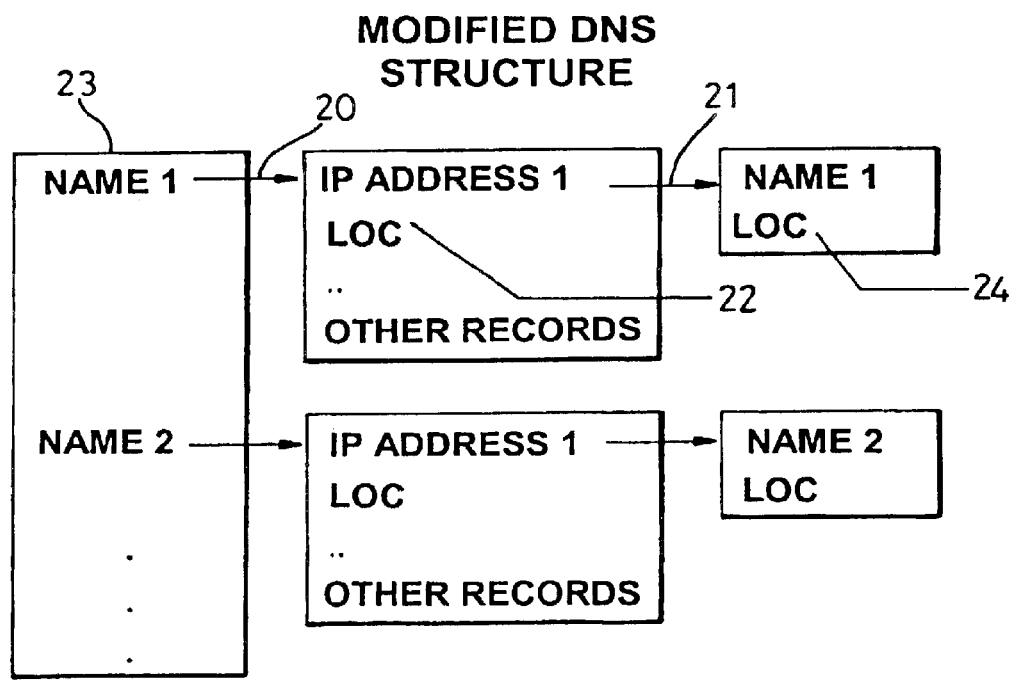

The Domain Name Server (DNS) forms a directory for the Internet. Referring now to FIG. 2($a$), it holds translations 20 of server names to the binary numbers needed to address IP packets. It can also translate 21 the binary addresses back into names, and has the potential to store other information, such as aliases, host information, e-mail exchange information, and of particular relevance here, location 22 associated with a particular address. RFC 1876 defines DNS Location Resource Record to have the form:

NAME LOC Latitude Longitude Altitude
   Size Horizontal precision Vertical precision
where "NAME" is the key used to look up the record, "LOC" is the type of the record and the following six sections are:

Latitude: The 3 decimal places on the seconds figure correspond to an expressible precision of 3 cm Longitude: expressible precision is 3 cm Cos(Latitude)

Altitude: in metres with an expressible precision of 10 cm relative to the World Geological Survey '84 ellipsoid Size: a sphere expressed as 1 digit of precision with a 1 digit scale from 1 cm to 90,000 km eg 50=5e0 5 cm diameter, 45=4e5=4 km diameter Horizontal Precision: Diameter of the circle of error, same representation as size.

Vertical Precision: This is the total possible range for the altitude, again using the same precision as Size.

So for example, a location record:

NAME LOC 50 48 45.200 N 0 22 13.600 W 20.00 m 1.00 m 20.00 m 100.00 m describes an entity "NAME" in a $2^{nd}$ floor room (20 metres up) on Worthing High Street, West Sussex, England, 1 metre in size, with a possible error in position of 20 metres horizontally, and up to 100 metres error in altitude (probably because the altitude reference spheroid that the GPS was currently set to was not known.)

At present there is only marginal use of DNS location records. The only known application is in a graphical "Traceroute" network debugging tool which draws the locations that a packet goes through on its way between a source and destination.

To do this the program identifies the nodes along the path by their network (binary) addresses. Having identified the nodes, the program does a "reverse" lookup to translate from network address to a human readable name, and then uses that name to attempt to find a LOC record for the node.

The invention requires DNS. Dynamic DNS (DDNS) is becoming more common, and a switch to DDNS use does not adversely impact the invention, though use of dynamic DNS can increase the utility and scalability of the invention, since it provides for simpler automated updates to the DNS data set.

When an information consumer 10$a$ connects to a website 191, the information request carries parameters supplied by the browser to make their information search more relevant. At a lower level the connection has the calling address to enable two way communication.

The web server software 191 usually extracts the calling address and presents it to the web application as part of the parameter set. Optionally the calling address may also be resolved: that is, the address is looked up in the DNS to find an associated host name, and this too may be presented. This is achieved through the standard library call "gethostbyaddr."

A LOC record 22 is usually associated with the host name 23 in the DNS so, to be able to find out the caller's location, another standard library call would be made to request the LOC record associated with the host name.

This lookup might take place either in the web server or the application being served. If it is performed in the web server then a standard text format should be used to communicate the location to the application server, and an implementation might also provide a routine to extract the data once more.

In addition to associating 20 the LOC record 22 with the host name 23 it is preferable to create a LOC record 24 directly accessible from the address record as shown in FIG. 2($b$). This has the benefits that:

Use of the LOC record is not constrained in the absence of a name record—a DNS entry with only a LOC record is possible.

The lookup is potentially more efficient as only a single request need be made, vs. the double lookup described above.

When session has been established there will in principle exist 4 (or more) DNS records associated with the dial-up host:

1. An Address to Hostname record
2. A Hostname to Address record
3. An Address to Location record
4. A Hostname to Location record Of these the first two may well be permanent, either permanently associated with a particular dial up service's equipment, or with a user who is assigned the same IP address and hostname each time they connect. Records 3 and 4 are associated with the present invention, and should be transient, only persisting for the duration of the connexion.

If the location data are not purged after the call is ended, there may exist a period where old location data may be associated with a user, which could subsequently "poison" a complete interaction with a service.

A location record associated with a disconnected host is essentially meaningless, so there is a case for asserting that there is no harm in allowing records to persist beyond the duration of the session. This is particularly true in the case of a dial-up service with heavily re-used equipment, where the data will be overwritten with new information relating to the next call, but if this approach is taken it is essential that the data are overwritten with each call.

Where IP address assignment is associated rather with the user than with the equipment, any location information stored in the DNS will persist until replaced when the user next logs in. This opens the possibility of data mining off line for information which the user may not wish to publish—where they are, how they move around the world, home postcode (by reversing one of the provisioning lookups), etc.

It is therefore desirable that part of call closure should be the deletion of the LOC record (which should in any case have a short Time To Live), or its substitution with a default value.

Figure 3:
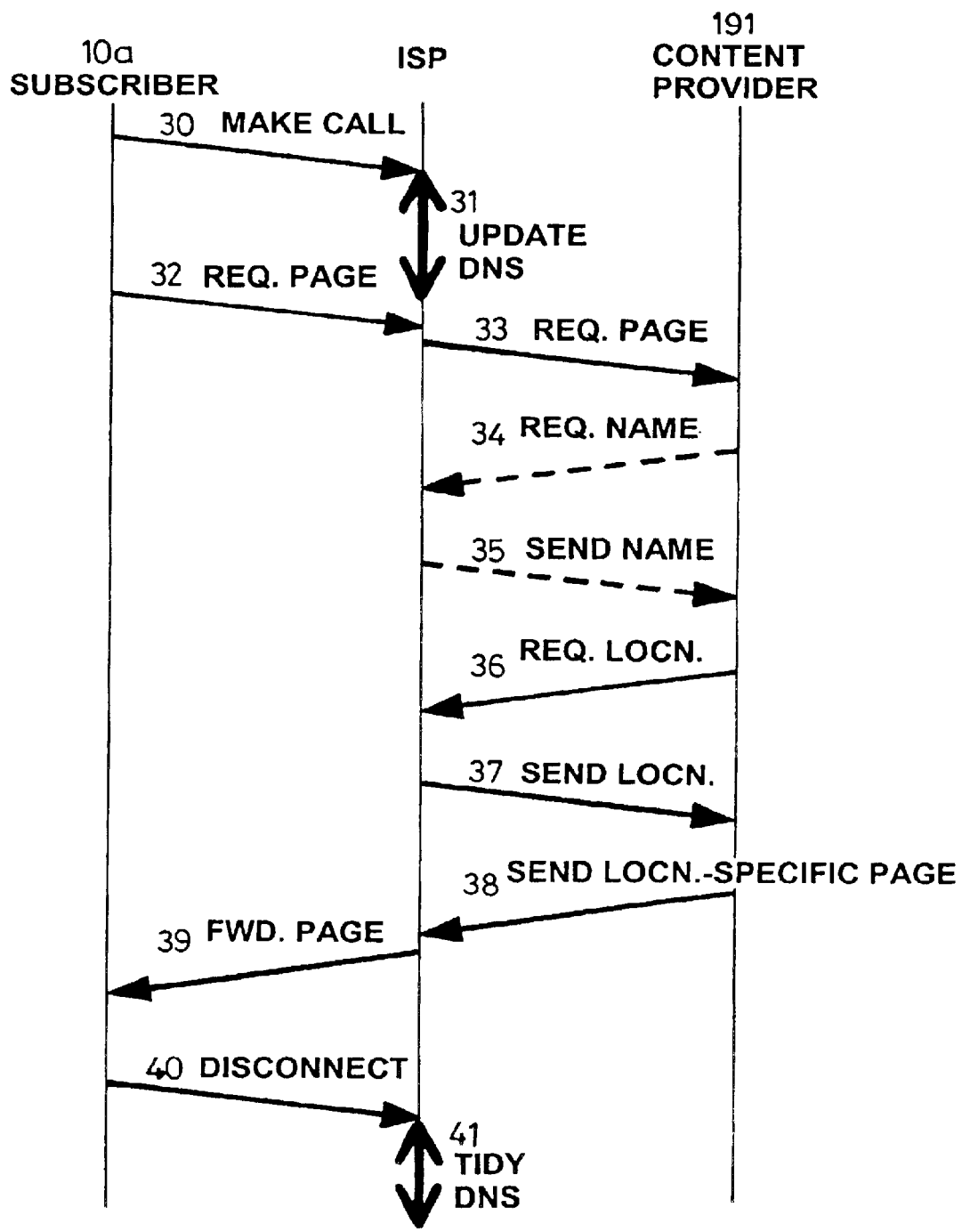
FIG. 3 shows a first example of a message sequence chart showing a series of interactions in accordance with the present invention.
Figure 4:
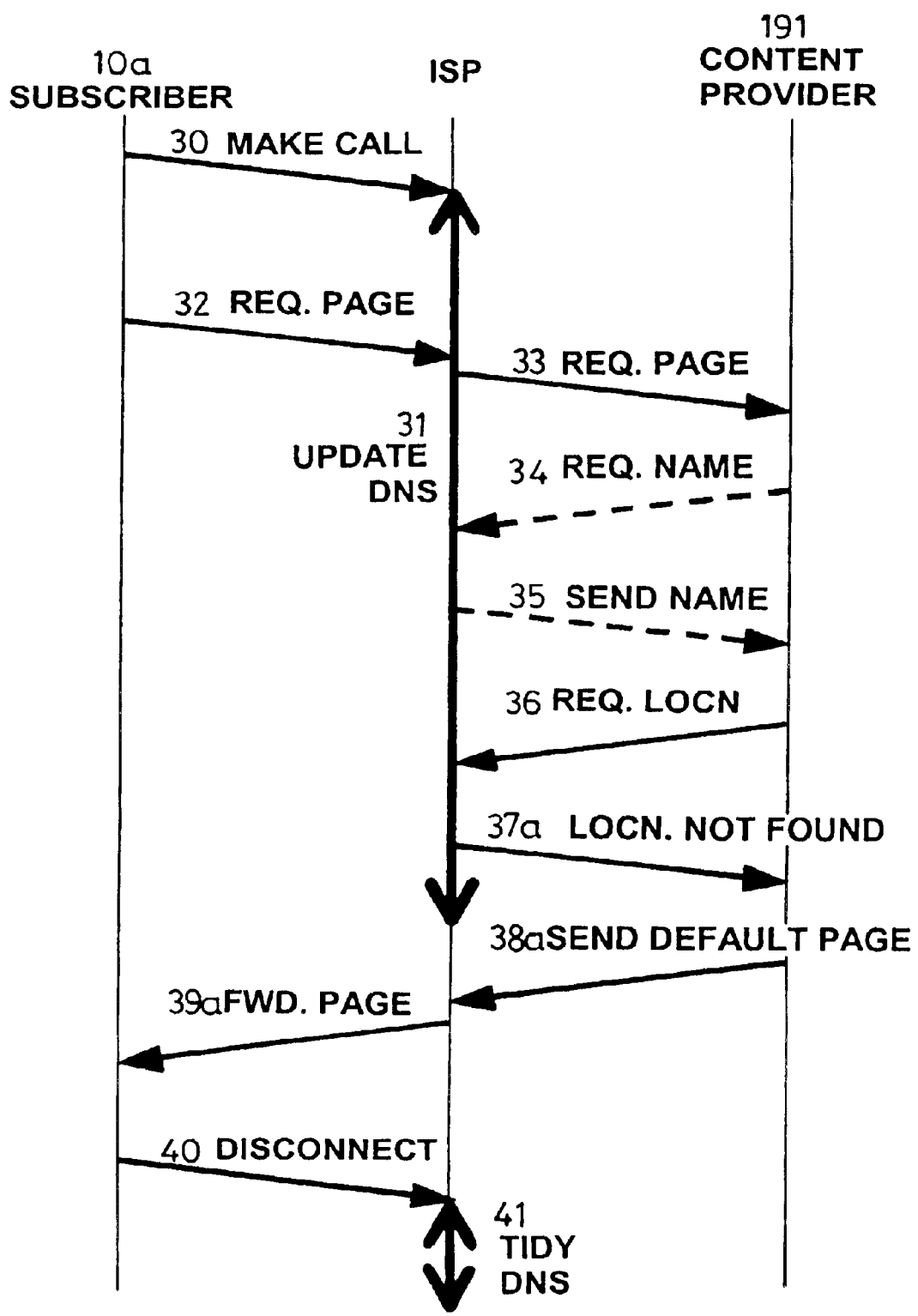
FIG. 4 shows a second example of a message sequence chart showing possible sequences with messages in accordance with the present invention.

Referring now to FIGS. 3 and 4 there are shown example message sequence charts illustrating the sequence of events during a subscriber connection. An initial call is set up 30 between the subscriber and the ISP. At this point the ISP can update the DNS 31 to incorporate location information relating to the subscriber making the call. Once the ISP DNS has been updated, any updates may be propagated to other DNS's in the conventional fashion. Once the call is established the subscriber may request a web page 32, 33 from a content provider 191 via the ISP. If the page is user location dependant, then the content provider may request 36 location information from an appropriate DNS, the appropriate location information if any being returned 37 to the content provider. Where the location information is not directly available in the DNS, the content provider may first request a name 34 from the DNS and then request the location responsive to receiving that name 35 from the DNS. Either of these two variations will be successful provided that the DNS update 31 is completed before the location 36 is requested from it. Once the content provider has identified the subscriber location details, the location specific page can be sent 38, 39 via the ISP to the subscriber. Upon disconnection 40 of the subscriber from the ISP the location information in the DNS may be tidied up 41 in order that stale data is not left in the DNS.

Referring now to FIG. 4 there is shown a further example of a message sequence in accordance of the present invention. This shows the scenario in which the updating and propagation of the DNS entries is delayed beyond the request for location information received from the content provider. In the scenario shown the interactions are as in FIG. 3 up to and including the request 36 for location information from the DNS. In this case the content provider 191 receives a "location not found" indication and, rather then sending a location dependant page, sends a default page 38a, 39a to the subscriber via the ISP, or as according to the prior art.

Figure 5:
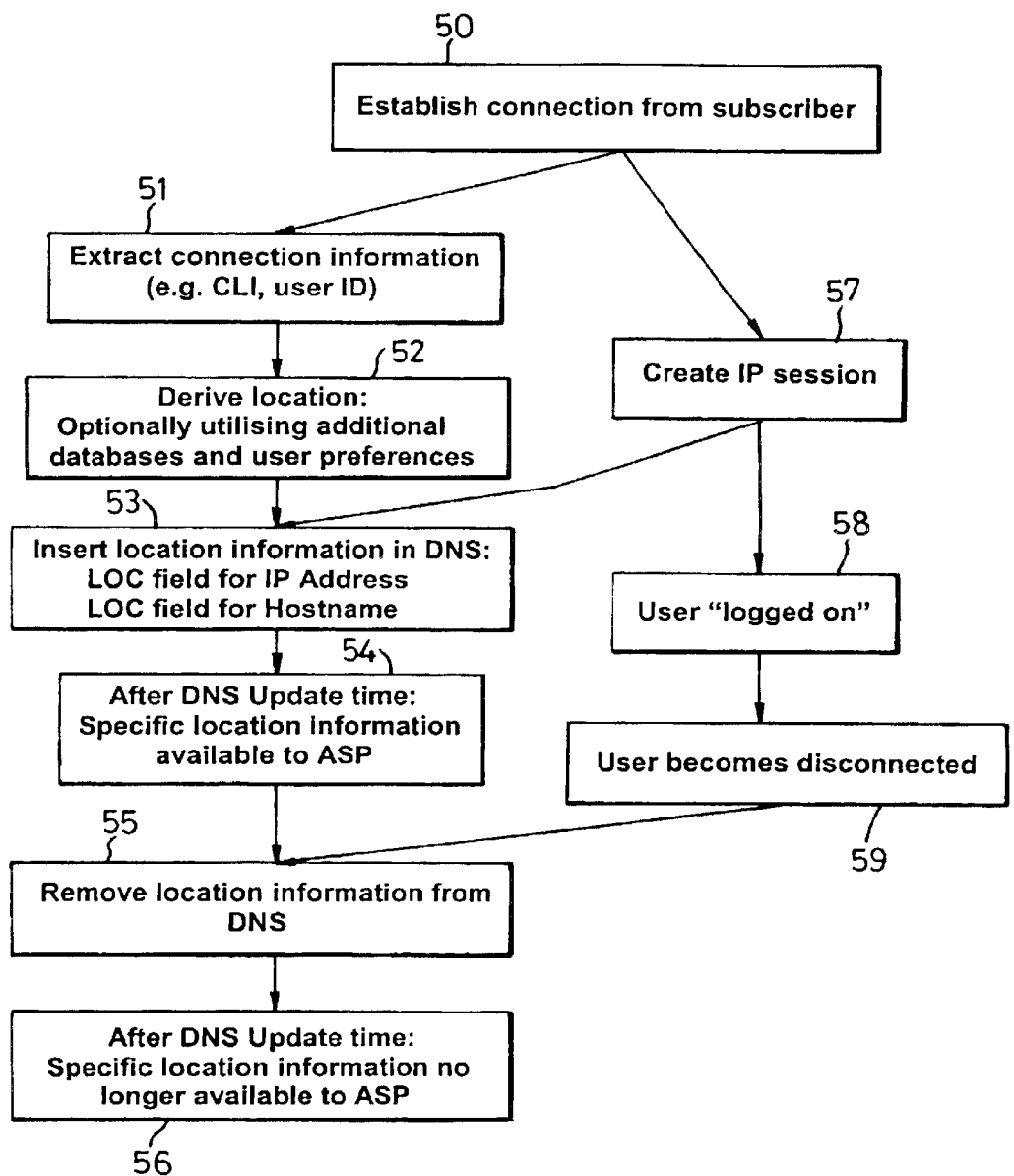
FIG. 5 shows an example flowchart of a method according to the present invention, forming part of the connection methods of FIGS. 3 and 4.

Referring now to FIG. 5 there is shown a summary of the overall method. Initially the subscriber establishes a connection 50 from which the ISP extracts connection information 51 from which location information may be derived 52. As indicated above the derivation of location information may make use of additional databases and user preferences (either pre-selected or selected as part of the connection establishment). While the information is being extracted, the user IP session is created 57 and, once both the IP session is created and the location information has been derived, the location information can be inserted 53 in the DNS. Once the DNS updates have occurred 54 the location information will be available to ASP's. Once the IP session has been created the user is effectively "logged on" 58 until he subsequently becomes disconnected 59. In the interim the user may access services available over the Internet. Location information may be provided automatically after DNS update time 54 but before removal 55 of location information from the DNS. Once the user has become disconnected 59 then the location information in the DNS is removed 55, and DNS updates propagated 56 after which the specific location information is no longer available to ASP's.

Any range or device value given herein may be extended or altered without losing the effect sought, as will be apparent to the skilled person for an understanding of the teachings herein.

What is claimed is:

1. A method of providing intrnet access comprising the steps of:
   receiving from a subscriber a connection request comprising an entity identification;
   deriving a location indication associated with the subscriber responsive to the entity identification; and
   causing an association between the location indication and the subscriber a to be created in a DNS table so the location indication is available to a content provider being accessed by the subscriber.

2. A method according to claim 1 additionally comprising the step of:
   making available the location indication responsive to a DNS request.

3. A method according to claim 1 in which the name is an internet protocol address.

4. A method according to claim 3 in which the internet protocol address is a subnet address.

5. A method according claim 1 in which the entity identification comprises at least one of: a calling number identification, a called number identification, an exchange modem identification, an incoming trunk group identification, a mobile handset location identification, a subscriber location identification, and a subscriber account identification.

6. A method according to a claim 1 wherein the stop of deriving comprises:
   where the request comprises a subscriber location identification, translating the subscriber location identification to a location indication in a pre-determined format;
   where the request comprises a calling line identification, translating the calling line identification to a location indication in a pre-determined format by means of at least one database containing pre-determined translation information; and
   where the quest comprises an exchange modem identification, translating the exchange modem identification to a location indication in a pre-determined format by means of at least one database containing pre-determined translation information.

7. A method of providing Internet content comprising the steps of:
   receiving a content request from a subscriber;
   requesting, from a DNS, a location indication associated with the subscriber; and
   providing content to the subscriber responsive to the location indication and the content request.

8. A method according to claim 7 in which the content request comprises a requesting address and in winch the step of requesting comprises requesting, from the DNS, a location indication associated with the requesting address.

9. A method according to claim 7 additionally comprising the step of:
   where the DNS contains no location indication associated with the content request, providing default content to the subscriber responsive to the content request.

10. An Internet service provider apparatus comprising:
    a port for receiving from a subscriber a connection request comprising an entity identification;
    a component for arranged for deriving a location indication associated with the subscriber responsive to the entity identification; and
    a component for causing an association between the location indication and the subscriber to be created in a DNS table so the location indication is available to a content provider being accessed by the subscriber.

11. Apparatus according to claim 10 additionally comprising:
    a component for making available the location responsive to a DNS request.

12. An Internet service provider network comprising apparatus according to claim 10.

13. Internet content provider apparatus comprising:
    a component for receiving a content request from a subscriber;
    a component for requesting from a DNS an location indication associated with the subscriber;

a component for providing content to the subscriber responsive to the location indication and the content request.

14. Apparatus according to claim 13 additionally comprising:

a component for, where the DNS contains no location indication associated with the subscriber, providing default content to the subscriber responsive to the content request.

15. A program for a computer on a machine-readable medium arranged to provide internet access and comprising:

code for receiving from a subscriber a connection request comprising an entity identification;

code for deriving a location indication associated with the subscriber responsive to the entity identification; and code causing an association between the location indication and the subscriber to be created in a DNS table so the location indication is available to a content provider being accessed by the subscriber.

16. A program for a computer on a machine-readable medium arranged to providing Internet content and comprising:

code for receiving a content request from a subscriber;

code for requesting, from a DNS, a location indication associated with the subscriber; and code for providing content to the subscriber responsive to the location indication and the content request.

* * * * *